(12) United States Patent
Jaworowicz et al.

(10) Patent No.: US 11,938,883 B2
(45) Date of Patent: Mar. 26, 2024

(54) SIDE AIRBAG DEPLOYMENT RAMP

(71) Applicant: ZF Passive Safety Systems US Inc., Washington, MI (US)

(72) Inventors: Courtney Jaworowicz, Macomb, MI (US); Rico Scott Bertossi, Kenockee, MI (US)

(73) Assignee: ZF PASSIVE SAFETY SYSTEMS US INC., Washington, MI (US)

(*) Notice: Subject to any disclaimer, the term of this patent is extended or adjusted under 35 U.S.C. 154(b) by 0 days.

(21) Appl. No.: 17/708,446

(22) Filed: Mar. 30, 2022

(65) Prior Publication Data
US 2023/0311802 A1 Oct. 5, 2023

(51) Int. Cl.
*B60R 21/207* (2006.01)
*B60R 21/16* (2006.01)
*B60R 21/231* (2011.01)

(52) U.S. Cl.
CPC ...... *B60R 21/207* (2013.01); *B60R 21/23138* (2013.01); *B60R 2021/161* (2013.01); *B60R 2021/23146* (2013.01)

(58) Field of Classification Search
None
See application file for complete search history.

(56) References Cited

U.S. PATENT DOCUMENTS

| | | | |
|---|---|---|---|
| 6,155,593 A | 12/2000 | Kimura et al. | |
| 7,377,542 B2* | 5/2008 | Tracht | B60R 21/207 |
| | | | 280/730.2 |
| 9,592,789 B2* | 3/2017 | Fujiwara | B60R 21/235 |

FOREIGN PATENT DOCUMENTS

| | | | | |
|---|---|---|---|---|
| CN | 107804269 A | * | 3/2018 | ........ B60R 21/232 |
| DE | 202017106454 U1 | * | 1/2018 | ........ B60R 21/213 |
| KR | 20120020967 A | * | 3/2012 | ........ B60R 21/214 |

\* cited by examiner

*Primary Examiner* — Faye M Fleming
(74) *Attorney, Agent, or Firm* — TAROLLI, SUNDHEIM, COVELL & TUMMINO L.L.P.

(57) ABSTRACT

A deployment ramp helps to direct a side airbag to deploy along a desired deployment trajectory from a vehicle seatback to a deployed position adjacent a side structure of the vehicle. The deployment ramp includes a mounting wall configured to be connected to a seat frame of the seatback. The deployment ramp also includes a deployment wall configured to deflect outboard of the vehicle seatback in response to airbag deployment and at least partially cover padding and/or a cover of the seatback. The deployment ramp further includes a bottom wall that extends between the mounting wall and the deployment wall, the bottom wall forming a reaction surface for side airbag deployment in the deployment trajectory.

23 Claims, 10 Drawing Sheets

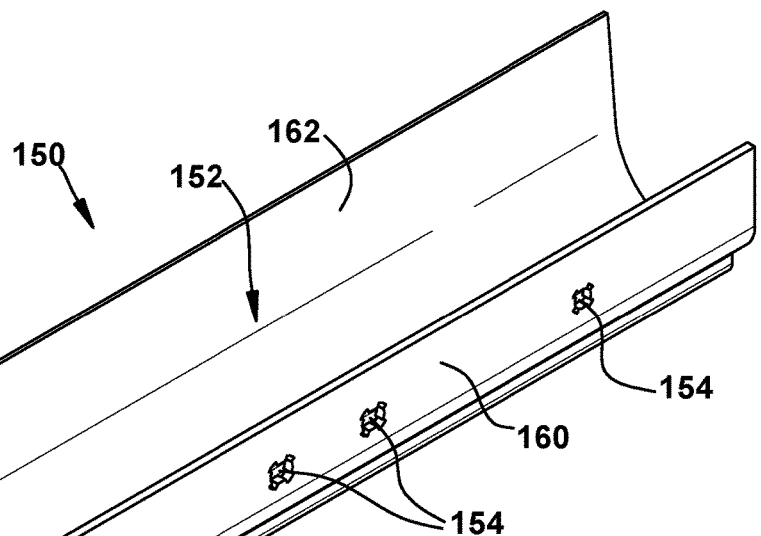
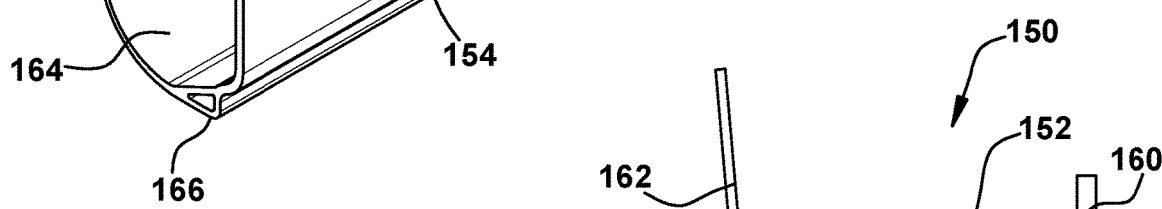
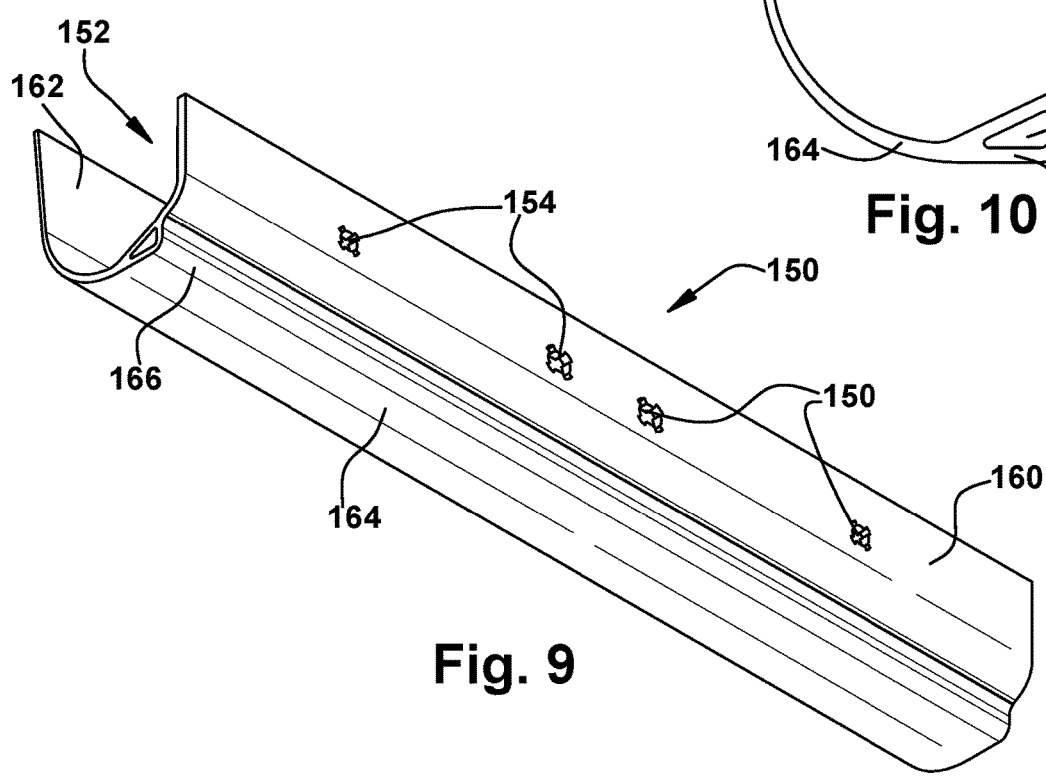
Fig. 8
Fig. 10
Fig. 9

SIDE AIRBAG DEPLOYMENT RAMP

TECHNICAL FIELD

This disclosure to an inflatable apparatus for helping to protect a vehicle occupant in the event of a side impact to the vehicle and/or a vehicle rollover. More specifically, this disclosure relates to a deployment ramp for a side airbag.

BACKGROUND

It is known to inflate an inflatable vehicle occupant protection device to help protect a vehicle occupant. One particular type of inflatable vehicle occupant protection device is a side airbag that is inflatable between a vehicle occupant and the side structure of the vehicle. A known side airbag is inflated with inflation fluid directed from an inflator to the curtain airbag.

In certain configurations, the side airbag and the inflator are components of an airbag module that is mounted in a vehicle seat. In one example implementation, the side airbag module can be mounted to a seat frame on an outboard side of a seatback of the vehicle seat. The side airbag, when inflated, deploys out of the seatback in a direction that has both lateral (i.e., toward a side structure of the vehicle) and forward (i.e., forward of the seatback) components. The side airbag, when inflated and deployed, can be positioned between the seated occupant and the side structure of the vehicle.

Because the seat is positioned adjacent the vehicle side structure, it is important that the side airbag deploys along a trajectory sufficient to ensure that the bag is positioned properly within the desired amount of time. There are several challenges with this task. Because the occupant is positioned relatively close to the side structure (as compared, for example, to the distance between the occupant and the instrument panel), the side airbag must inflate and deploy both quickly and accurately. Because the side airbag module is mounted within the vehicle seatback, the inflating airbag must open a rupturable portion of the seat fabric and exit the confines of the seatback and also take on the lateral/forward trajectory described above. Deployment trajectory is therefore a primary concern when it comes to the design and implementation of side airbag modules.

Conventional side airbag modules can have a variety of configurations. In some instances, side airbag modules can employ the use of hard covers that surround the inflator and the rolled/folded airbag. Hard covers are typically constructed of plastic or a combination of metal and plastic and can serve as a reaction surface against which the airbag deploys. As a reaction surface, the hard cover can assist in promoting/enforcing a desired deployment trajectory for the side airbag.

It may, however, be desirable to implement a soft cover formed, for example, of airbag fabric. The fabric soft covers help protect the airbag and maintain the airbag in its pre-deployment rolled/folded condition. The soft covers also facilitate a rapid deployment of the side airbag and offer little resistance to deployment. At the same time, however, the soft cover cannot be relied upon to control or otherwise effect the airbag's deployment trajectory because the soft cover lacks the structure necessary to serve as a reaction surface. The deployment trajectory of soft cover side airbags can typically be controlled by the roll/fold configuration of the airbag. There are, however, certain scenarios where additional deployment aids can be necessary.

Accordingly, while a side impact airbag module including a soft cover can reduce the weight and cost of the module, it still can be necessary to provide a reliable reaction surface to aid airbag deployment. Because of this, the existing vehicle structure, such as the seat foam, seat cover, seat frame, and vehicle trim (B-pillar, door trim), is the only structure that can be utilized as a reaction surface for helping to control airbag deployment. While the roll/fold of the airbag can be sufficient to control the airbag deployment trajectory, there are scenarios where the roll/fold is not enough to ensure proper deployment in a repeatable and reliable manner. This can, for example, be the case where certain vehicle structures, such as trim pieces, are positioned at a specific location relative to the airbag module. This can occur, for instance, where a vehicle seat is adjusted to a position that results in the trim piece being positioned in the deployment path of the airbag. In this instance, the deploying airbag can fail to clear vehicle trim, which can inhibit proper deployment, creating a risk that the airbag will not afford the occupant the desired level of protection.

SUMMARY

A side impact airbag module with a soft cover is configured to be mounted on a seatback of the vehicle. The airbag module is configured to be connected to the seat frame in the seatback on an outboard side of the seat. The side impact airbag module has a stored condition in which the airbag is deflated and rolled/folded and packaged in the soft cover. The airbag module is concealed within the seatback behind the seat covering and foam or other padding material. The seat covering has a tear seam that ruptures in response to inflation of the airbag, which forms a deployment opening through which the airbag deploys.

The side impact airbag module includes a deployment ramp configured to provide a reaction surface for helping control the deployment of the airbag. The deployment ramp helps direct the airbag to deploy through the deployment opening to the desired position between the seated occupant and the side structure of the vehicle. To achieve this result, the deployment ramp is configured to help direct the airbag to deploy forward of the seatback. Because the airbag must first exit the seatback through the deployment opening, the deployment direction must have a lateral component. Accordingly, the deployment trajectory that the deployment ramp is configured to promote can have both lateral and forward components.

The deployment ramp is also configured to control the deployment trajectory of the side impact airbag so that it avoids trim pieces on the side structure, such as trim pieces on the B-pillar or on the vehicle door. Because the seat is adjustable in the fore-aft direction and also in the upright-reclined direction, the structure at or against which the side airbag deploys can vary. It is therefore important for the airbag to deploy in a repeatable and reliable manner in order to avoid the side structure inhibiting deployment, whether by trim pieces snagging the airbag side structure components (e.g., trim pieces) blocking the airbag. In some configurations, the deployment ramp can be configured to achieve this purpose through control of the airbag deployment trajectory alone, so that the airbag deploys along a trajectory that avoids the side structure.

In other configurations, the deployment ramp can be configured to "bridge the gap," so to speak, with the deployment ramp being configured to span the space between the seatback and the side structure and engage the side structure, e.g., the door or the B-pillar, depending on the position of the seat and seatback. Through this engagement, the deployment ramp can be supported at one end at the connection to the seat frame and at the opposite end by the side structure, and can thereby control the deployment trajectory while, at the same time covering or otherwise blocking engagement between the airbag and the side structure. Advantageously, in this configuration, the deployment ramp can be configured to cover edges or seams of side structure trim pieces or other components, which prevents the airbag from engaging the trim pieces.

According to one aspect, a deployment ramp helps to direct a side airbag to deploy along a desired deployment trajectory from a vehicle seatback to a deployed position adjacent a side structure of the vehicle. The deployment ramp includes a mounting wall configured to be connected to a seat frame of the seatback. The deployment ramp also includes a deployment wall configured to deflect outboard of the vehicle seatback in response to airbag deployment and at least partially cover padding and/or a cover of the seatback. The deployment ramp further includes a bottom wall that extends between the mounting wall and the deployment wall, the bottom wall forming a reaction surface for side airbag deployment in the deployment trajectory.

According to another aspect, the bottom wall can be configured to deflect relative to the mounting wall to orient the bottom wall substantially normal to deployment trajectory.

According to another aspect, the bottom wall can be configured to deflect relative to the mounting wall to orient the bottom wall along a base plane that is substantially normal to the deployment trajectory.

According to another aspect, the deployment ramp can also include a standoff in the area of an interface between the mounting wall and the bottom wall. The standoff can be configured to reinforce the deployment ramp to control its resistance to deflection of the bottom wall relative to the mounting wall.

According to another aspect, the standoff can be configured to engage vehicle structure and block deflection of the bottom wall relative to the mounting wall.

According to another aspect, the standoff can be configured to engage vehicle structure at a point during deflection of the bottom wall relative to the mounting wall where the bottom wall is oriented along a base plane that is substantially normal to the deployment trajectory.

According to another aspect, the standoff can include two or more legs that intersect the bottom wall and each other to form an opening extending the length of the deployment ramp.

According to another aspect, the standoff can be configured so that the opening has a generally triangular configuration.

According to another aspect, the standoff can have a tubular configuration and extends along the length of the deployment ramp.

According to another aspect, the mounting wall can include one or more openings for receiving a fastener for securing the deployment ramp to the vehicle seatback.

According to another aspect, the deployment ramp can have a uniform cross-section along its length so that it can be constructed as a plastic extrusion.

According to another aspect, the deployment wall can be configured to extend from the seatback into engagement with the side structure.

According to another aspect, the deployment wall can be configured to cover portions of the side structure.

According to another aspect, the deployment trajectory can have an outboard component and a forward component, with respect to the vehicle.

According to another aspect, the deployment ramp can be a component of an airbag module, which can include a side airbag and an inflator for inflating the side airbag. The inflator can include mounting studs that extend through the airbag and through openings in the mounting wall to connect the deployment ramp, side airbag, and inflator to the seatback.

According to another aspect regarding the airbag module, the deployment ramp can define a channel for receiving the side airbag in a rolled and/or folded condition.

According to another aspect, the airbag module can also include an airbag wrap that encircles the deployment ramp with the side airbag rolled and/or folded in the channel to maintain the airbag module in a packaged condition. The airbag wrap being configured to rupture in response to inflation of the side airbag to allow the side airbag to inflate and deploy.

According to another aspect regarding the airbag module, the airbag wrap has opposite ends with openings through which the inflator mounting studs extend to connect the airbag wrap to the airbag module.

According to another aspect regarding the airbag module, the inflator can include discharge openings through which inflation fluid is discharged into the airbag. The discharge openings can be configured to direct inflation fluid along the deployment trajectory.

According to another aspect, the airbag module can be a component of a vehicle safety system, which can include a sensor for sensing vehicle conditions and a controller that is operative to receive a signal from the sensor that is indicative of the sensed vehicle conditions. The controller can be configured to evaluate the signal from the sensor to identify vehicle crash conditions and to control the actuation of the inflator to inflate and deploy the side airbag in response to the identified vehicle crash conditions.

DRAWINGS

The foregoing and other features of the present disclosure will become apparent to one skilled in the art to which the present disclosure relates upon consideration of the following description with reference to the accompanying drawings, in which:

FIGS. 8-11 illustrate a deployment ramp that forms a component of the airbag module.

DETAILED DESCRIPTION

Figure 1:
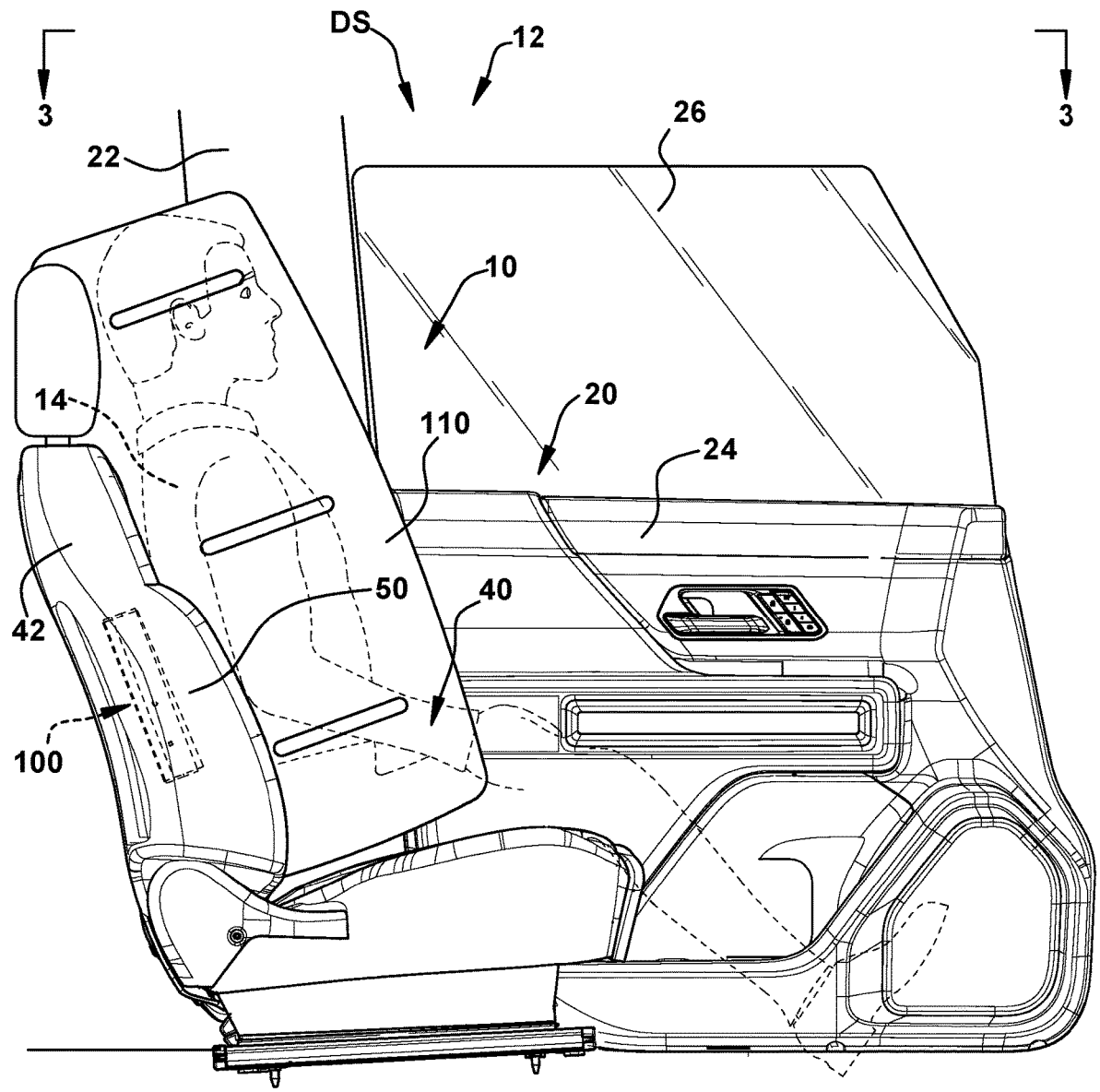
FIG. 1 is a side view illustrating a vehicle and a vehicle safety system including a side airbag in an inflated and deployed condition, according to one example configuration.
Figure 2:
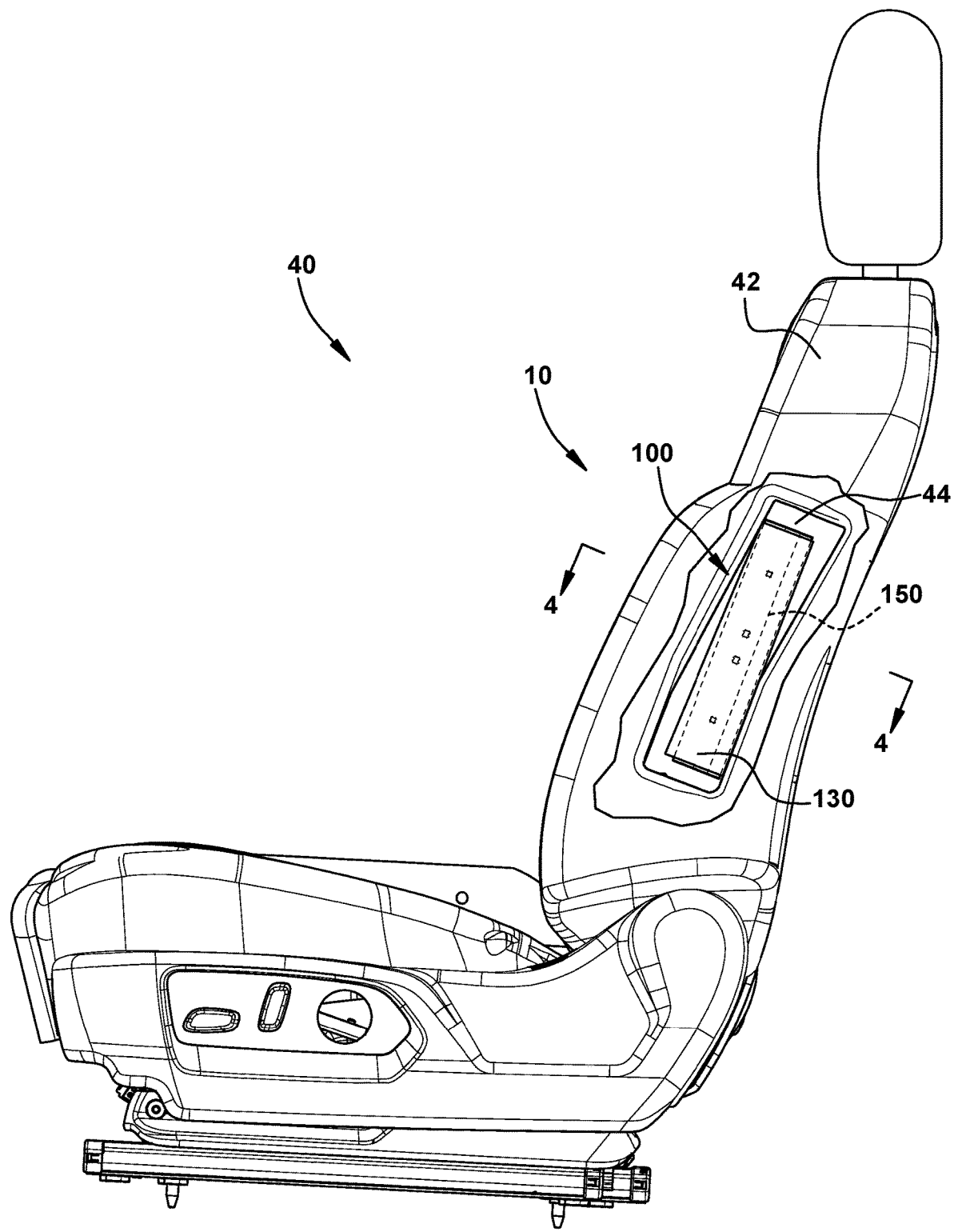
FIG. 2 is a side view of a vehicle seat of FIG. 1 viewed from an outboard side of the vehicle and including a cutout portion revealing an airbag module of the vehicle safety system mounted in a seatback of the vehicle seat.

An apparatus 10 helps to protect an occupant 14 of a vehicle 12. As shown in FIGS. 1 and 2, according to one example configuration, the apparatus 10 includes an inflatable vehicle occupant protection device in the form of a side airbag 110 that is inflatable between the occupant 14 and a side structure 20 of the vehicle 12. The side structure 20 includes a B pillar 22 and a side door 24 with a window/window opening 26.

The vehicle 12 also includes a seat 40 upon which the occupant 14 can be seated. In the example configuration illustrated in FIGS. 1 and 2, the seat 40 is a first or front row seat located on a driver side DS of the vehicle 12. The scope of the invention is not limited to a front row or to a driver side implementation. The invention described herein can be applied to a seat in any seating row in the vehicle 12, on either side, driver or passenger, of the vehicle.

Those skilled in the art will recognize that the configuration of the vehicle structure and, thus, the spatial and interconnecting relationships between the vehicle structure (i.e., the side structure 20, seat 40, etc.) can vary depending upon the particular design of the vehicle 12. Therefore, it should be recognized that the vehicle structure illustrated in the figures is for illustrative purposes and may vary without departing from the spirit of the present invention.

The side airbag 110 is a component of a side airbag module 100 that is configured to be installed in/on the vehicle seat 40. More specifically, the side airbag module 100 is configured to be installed in a seatback 42 of the vehicle seat 40. The side airbag module 100 can, for example, be configured to be connected to a portion of the seat frame 44 that helps form the seatback 42. The side airbag module 100 is configured to be concealed behind an outer covering 50 of the seat 40 when installed. In the installed condition, the side airbag module 100 can also be embedded in, or at least partially surrounded by, seat padding 52, such as a foam cushioning material.

The side airbag 110 includes overlying panels that are interconnected along at least a portion of a perimeter of the side airbag to form a perimeter connection that defines an inflatable volume of the airbag. The side airbag 110 can also include interior connections in which the overlying panels are interconnected within the perimeter to form non-inflatable portions and to help define inflatable chambers of the airbag.

The side airbag 110 can be formed in a variety of manners, such as by weaving the overlying panels in a one piece woven (OPW) construction in which yarns (e.g., nylon yarns) are woven simultaneously to form both one layer and two layer portions of the airbag. The side airbag 110 could alternatively be formed from separately woven panels that are interconnected, for example, by stitching, ultrasonic welding, heat bonding, or adhesives. The side airbag 110 can be coated with a gas impermeable material, such as urethane, or laminated with a gas impermeable film. The side airbag 110 thus may have a substantially gas-tight construction. Those skilled in the art will appreciate that alternative materials, such as polyester yarn, and alternatives coatings, such as silicone, can also be used to construct the side airbag 110.

As shown in FIGS. 3-7, in addition to the side airbag 110, the side airbag module 100 also includes an inflator 120, a deployment ramp 150, and a soft cover 130. To assemble the side airbag module 100 for installation in the vehicle 12, the inflator 120 is positioned in a mouth portion 112 of the side airbag 110. Inflator mounting studs 122 that protrude from the inflator 120 extend through corresponding openings 114 of the side airbag 110 (see FIG. 7). The side airbag 110 is rolled and/or folded in a predetermined manner as shown, for example, in FIGS. 4 and 7. The inflator 120 and the rolled/folded side airbag 110 are positioned in a recess 152 of the deployment ramp 150, with the inflator mounting studs 122 (e.g., threaded studs) extending through corresponding openings 154 (see FIGS. 7-11) of the deployment ramp 150.

Figure 7:
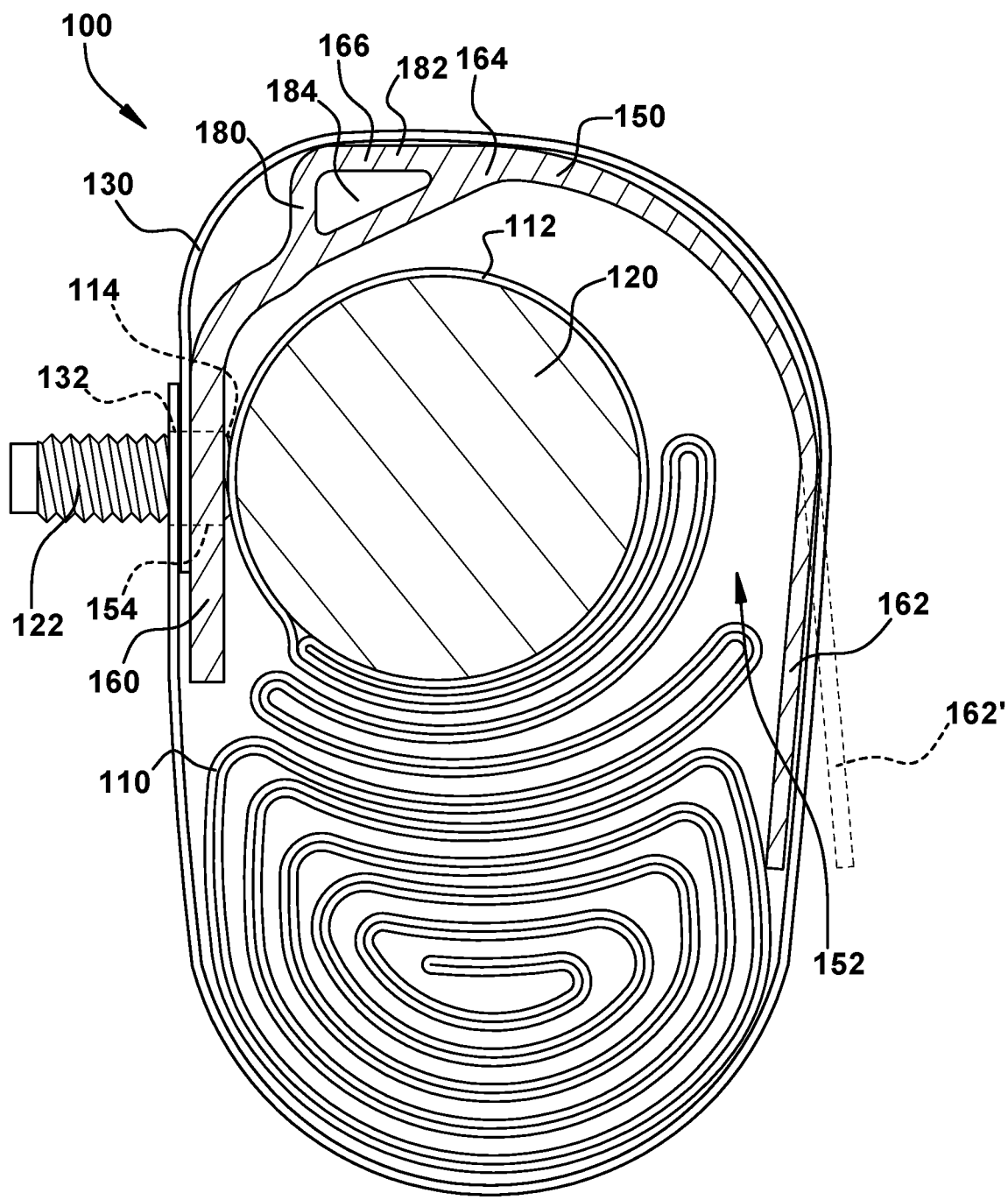
FIG. 7 is an end view illustrating an airbag module of the apparatus in a packaged condition ready for installation in the seat.

As shown in FIG. 7, the soft cover 130 is wrapped around the deployment ramp 150 with the rolled/folded side airbag 110 and inflator 120 positioned therein. Opposite ends of the soft cover 130 include openings that correspond in size and spacing to the mounting studs 122 projecting through the deployment ramp 150. The openings 132 at one end of the soft cover 130 are placed over the mounting studs 122; the cover is wrapped around the deployment ramp 150, side airbag 110, and inflator 120; and the openings 132 at the opposite end of the soft cover are positioned over the mounting studs 122. The soft cover 130 thereby envelopes the deployment ramp 150, airbag 110, and inflator 120. In this assembled condition of the airbag module 100, the airbag 110 can be said to be "packaged" by the soft cover 130.

The assembled airbag module 100, with the airbag 110 packaged by the soft cover 130, is ready for installation in/on the vehicle seat 40. The airbag module 100 is maneuvered so that the mounting studs 122 extend through corresponding openings in the seat frame portion 44 of the seatback 42. Threaded fasteners 124, such as hexagonal nuts, along with any other components, such as washers, etc., are installed on the mounting studs 122, and tightened to secure the airbag module 100 to the seat frame. When the airbag module 100 is secured to the seat frame 44 via the fasteners 124, the assemblage airbag module 100 is fixed, i.e., the side airbag 110, inflator 120, deployment ramp 150, and soft cover 130 are connected or locked together via the mounting studs 122 and cannot be separated.

To accommodate its installation on the seat frame 44 within the seat padding 52 behind the seat cover 50, the airbag module 100 must be configured so that the side airbag 110 can inflate and deploy to the desired position along the side structure 20, between the seat 40 and/or occupant 14 and the side structure. This is not a trivial matter, as there are several challenges to account for and overcome, which are best considered with reference to FIGS. 1-6.

For example, there is very little space between the seatback 42 and the side structure 20. Notwithstanding this, the side airbag 110 needs to deploy along a trajectory that has both outboard and forward components. The side airbag 110 needs to deploy outboard in order to exit the seatback 42 through the seat cover 50, and forward to position itself between the seat/occupant and the side structure 20. Because there is little space between the seat 40 and the side structure 20, it will be appreciated that the seated occupant 14 is also positioned close to the side structure. Due to this close spacing, in the event of a side crash event, the side airbag 110 needs to be deployed, i.e., inflated, to the desired position and pressurization, quickly, because the time between the occurrence of the crash event and the occupant impacting the side structure 20 will be short.

Figure 3:
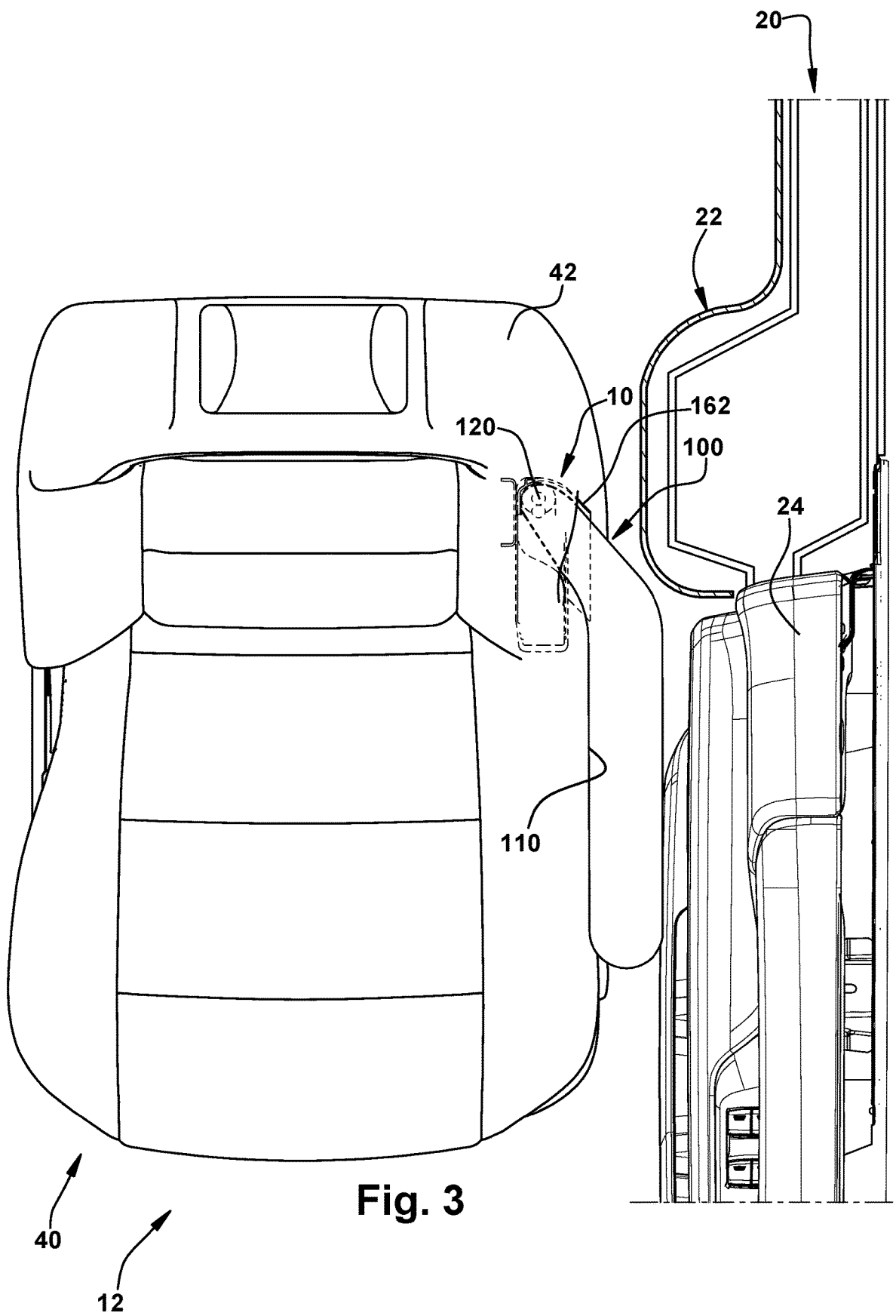
FIG. 3 is a top view from the perspective of line 3-3 in FIG. 1 illustrating the spatial relationship between the vehicle seat and adjacent outboard vehicle structure with the seat in a forward seat position.
Figure 4:
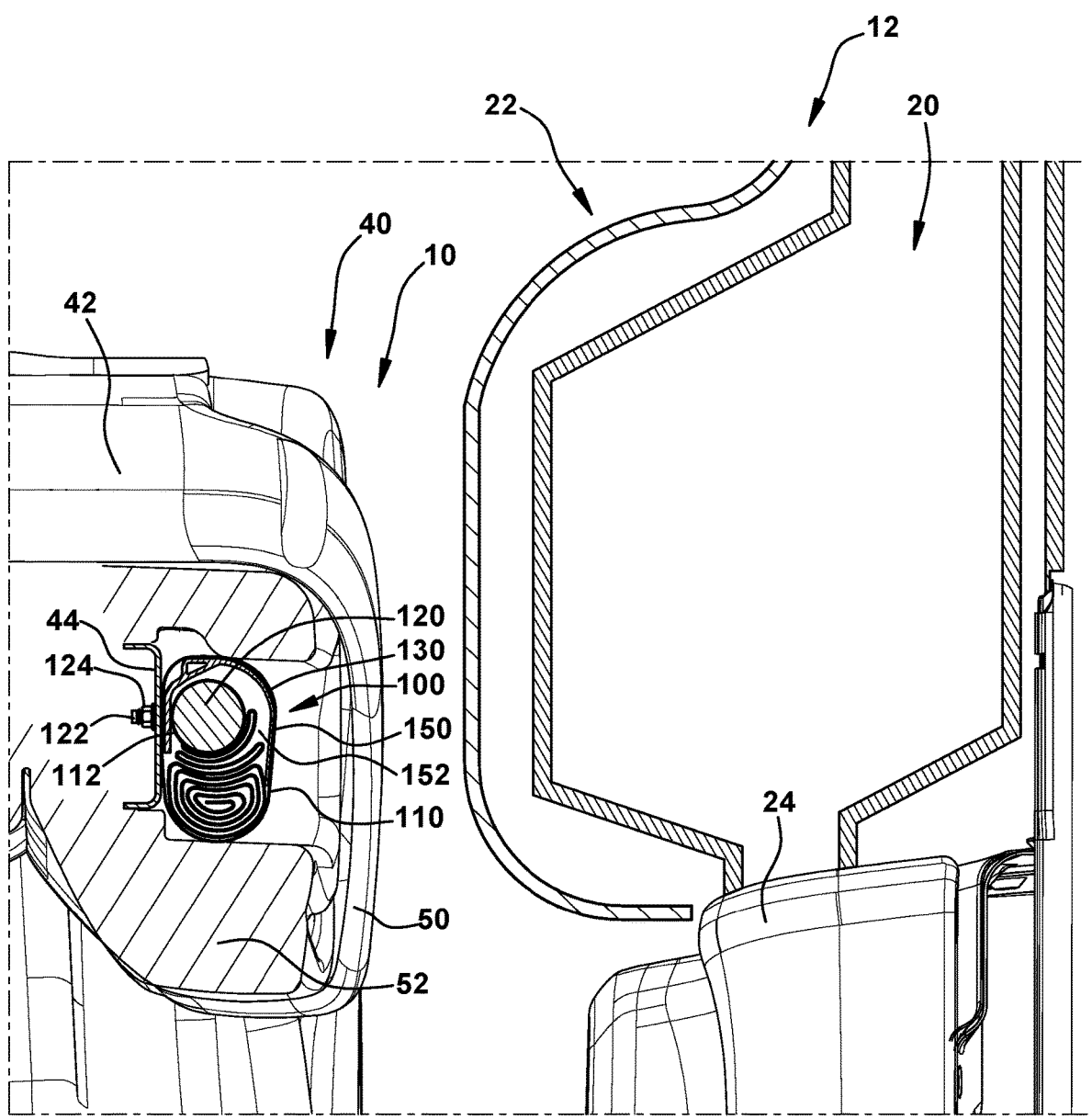
FIG. 4 is a magnified sectional view taken generally along line 4-4 in FIG. 2 illustrating the airbag module in a pre-deployment condition.
Figure 5:
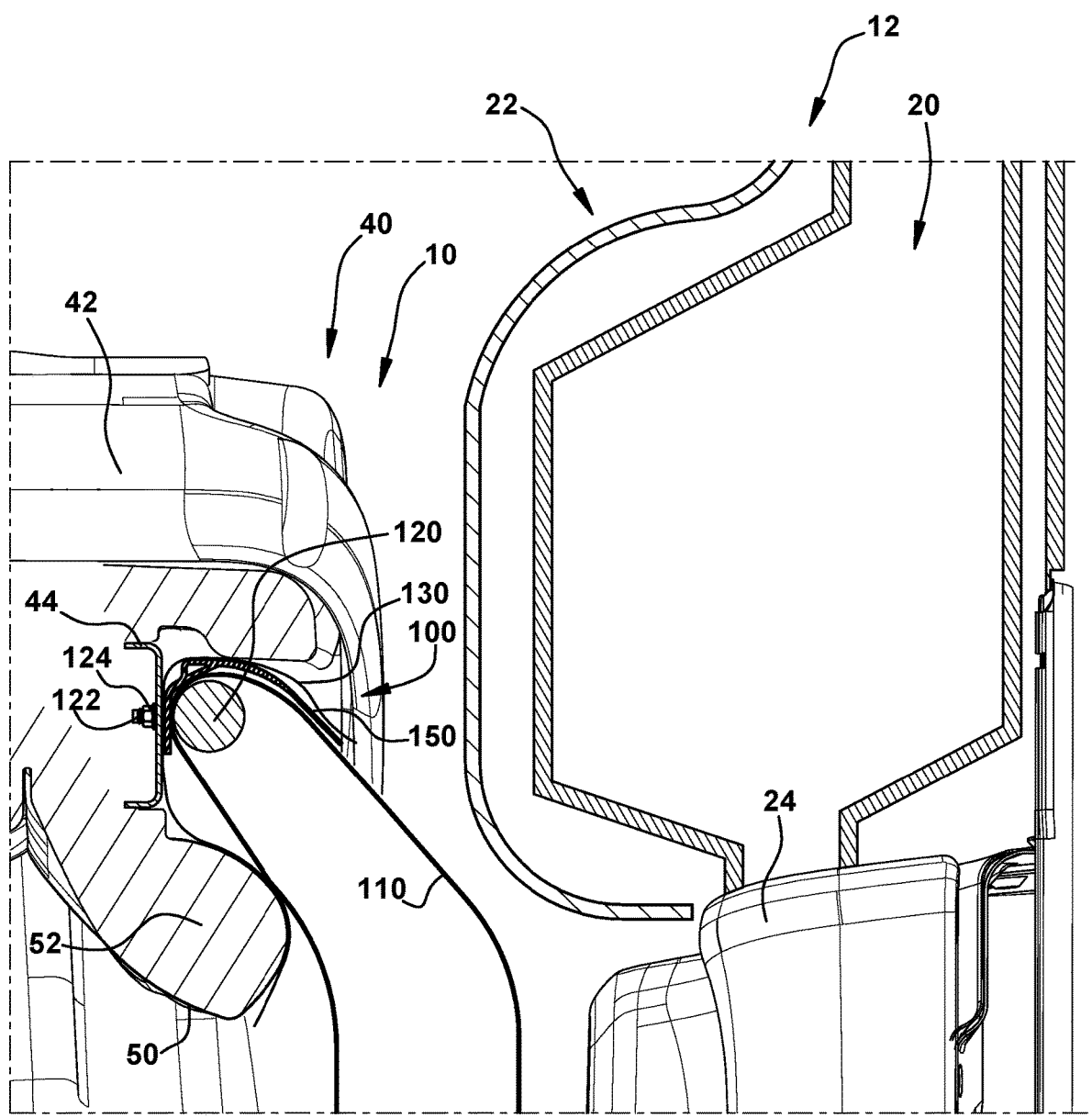
FIG. 5 is a sectional view, similar to FIG. 4, that illustrates the airbag module and side airbag in a deployed condition.
Figure 6:
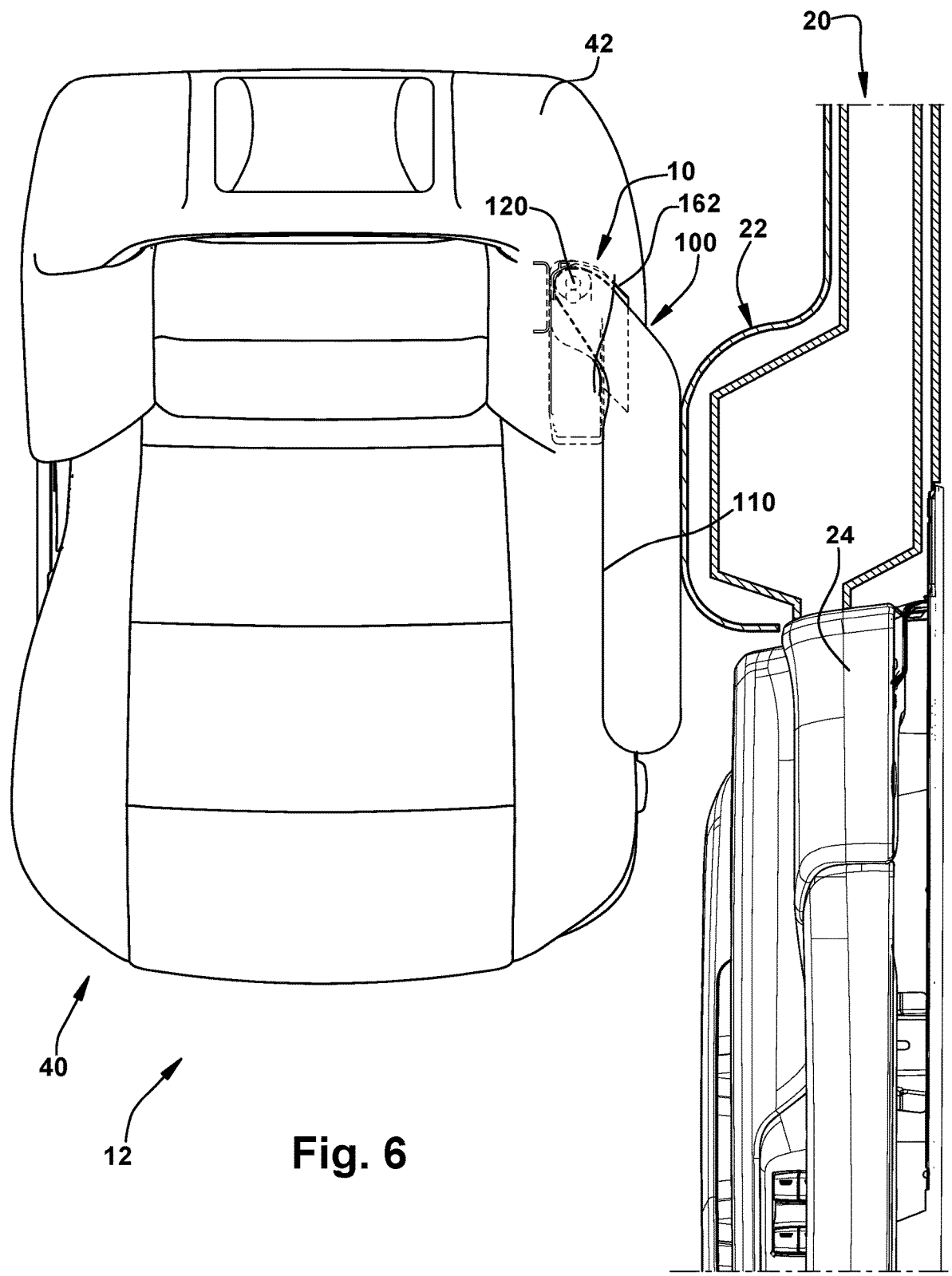
FIG. 6 is a top view, similar to FIG. 3, illustrating the spatial relationship between the vehicle seat and adjacent outboard vehicle structure with the seat in a rearward seat position.

Additionally, the position of the vehicle seat 40, particularly the seatback 42, is not fixed. The position of the seat 40, and thus the seatback 42, can be adjusted forward/rearward in the vehicle 12. Additionally, the angle of the seatback 42 can be adjusted to a desired degree of recline/incline. Because of this, the structure along which the side airbag 110 deploys, i.e., the portion of the side structure 20 covered by the airbag, can change. For instance, at a forward and upright position of the vehicle seat 40 and seatback 42, the side airbag 110 will deploy along the side door 24. This is shown in FIGS. 3-5. At a rearward and/or reclined position of the seat 40/seatback 42, the side airbag 110 will deploy along the B-pillar 22. This is shown in FIG. 6.

The B-pillar 22 and side door 24 each have trim pieces that form the class A surface of those structures. A class A surface is known in the art to mean that the surface is openly visible to occupants of the passenger compartment. Class A surfaces therefore have a fit and finish that is both utilitarian and aesthetically pleasing.

Vehicle trim pieces can interfere with deployment of the side airbag 110. If the seat 40/seatback 42 is positioned so the side airbag 110 deploys at an edge or seam of the vehicle trim piece, it can "catch" on the trim piece. As a result, deployment of the side airbag 110 can be inhibited or delayed, which can significantly reduce, or even preclude altogether, its effectiveness. Whether this interference occurs depends on a variety of factors, including the seat 40 position, the seatback 42 incline/recline, and the configuration of the side structure 20 and the trim pieces covering its components.

The threat of the side airbag 110 catching on these trim pieces is dynamic and depends on the position/orientation of the seat 40 and seatback 44 relative to the side structure 20. Therefore, it is important to configure the airbag module 100 so that the airbag 110 can deploy without trim piece interference regardless of the condition of the seat 40 and/or the seatback 44 at the time of deployment. Advantageously, the deployment ramp 150 is configured to help ensure that the side airbag 110 can deploy without getting caught on, or otherwise inhibited by, trim pieces on the vehicle side structure 20.

To do this, the deployment ramp 150 is configured to control the deployment trajectory of the side airbag 110 so that it deploys from the seatback 42 in a repeatable and reliable manner. The deployment ramp 150 controls side airbag 110 deployment by acting as the reaction surface for the deploying airbag. Because the airbag is just that—a bag that is inflated—the direction in which it is inflated can be influenced greatly by limiting or inhibiting inflation and bag movement in other directions. The deployment ramp 150 is configured for this purpose and to achieve this result.

Referring to FIGS. 8-11, the deployment ramp 150 has an elongated, trough-like configuration that is generally U-shaped in cross-section. The deployment ramp 150 includes a mounting wall 160 and a deployment wall 162 interconnected by a bottom wall 164. The mounting wall 160 includes a series of mounting apertures 154 through which fasteners 170 (see FIG. 11) and/or the inflator mounting studs 122 can extend in order to connect the deployment ramp 150 and the air bag module 100 to the vehicle structure, e.g., the seat frame 44.

The deployment ramp 150 also includes a standoff 166 that improves the rigidity of the ramp along its length and can also serve as a reinforcement against ramp bending/deflection of the bottom wall 164 relative to the mounting wall 160. The standoff 166 therefore improves the effectiveness of the deployment ramp 150 as a reaction surface for the side airbag 110 Additionally, the standoff 166 can act as a stop for blocking further deflection of the ramp in response to inflation and deployment of the side airbag 110 when moved into engagement with rigid vehicle structure, such as the seat frame 44 (see FIG. 11). Through this/these function(s), the deployment ramp 150 can not only serve as a reaction surface for the deploying side airbag 110, these structures can also be tailored so that the reaction surface provided by the ramp is configured at a desired orientation and position.

In the example configurations disclosed herein, the standoff 166 includes legs 180, 182 that intersect with the bottom wall 164 and with each other, forming an opening 184 having a generally rounded triangular configuration. The opening 184 extends the length of the deployment ramp 150. The standoff 166 can have different configurations consistent with the purposes and effects described herein. The legs 180, 182, and the portion of the bottom wall 164 effectively form a closed tubular structure that is integral with the deployment ramp 150 and which lends the structural rigidity and reinforcement of the deployment ramp 150. While the standoff has the generally triangular configuration illustrated in the example configuration illustrated and described herein, it could have alternative cross-sectional configurations.

Advantageously, the deployment ramp 150 can have a uniform cross section along its length, which allows it to have an extruded plastic construction. This is advantageous because the plastic deployment ramp 150 can be extruded as a continuous length of material that is cut to length in order to form each ramp. Thereafter, the only remaining manufacturing step is that of forming the openings 154 in the mounting wall 160. The deployment ramp 150 can therefore be manufactured quickly, simply, and in a cost-effective manner.

Figure 11:
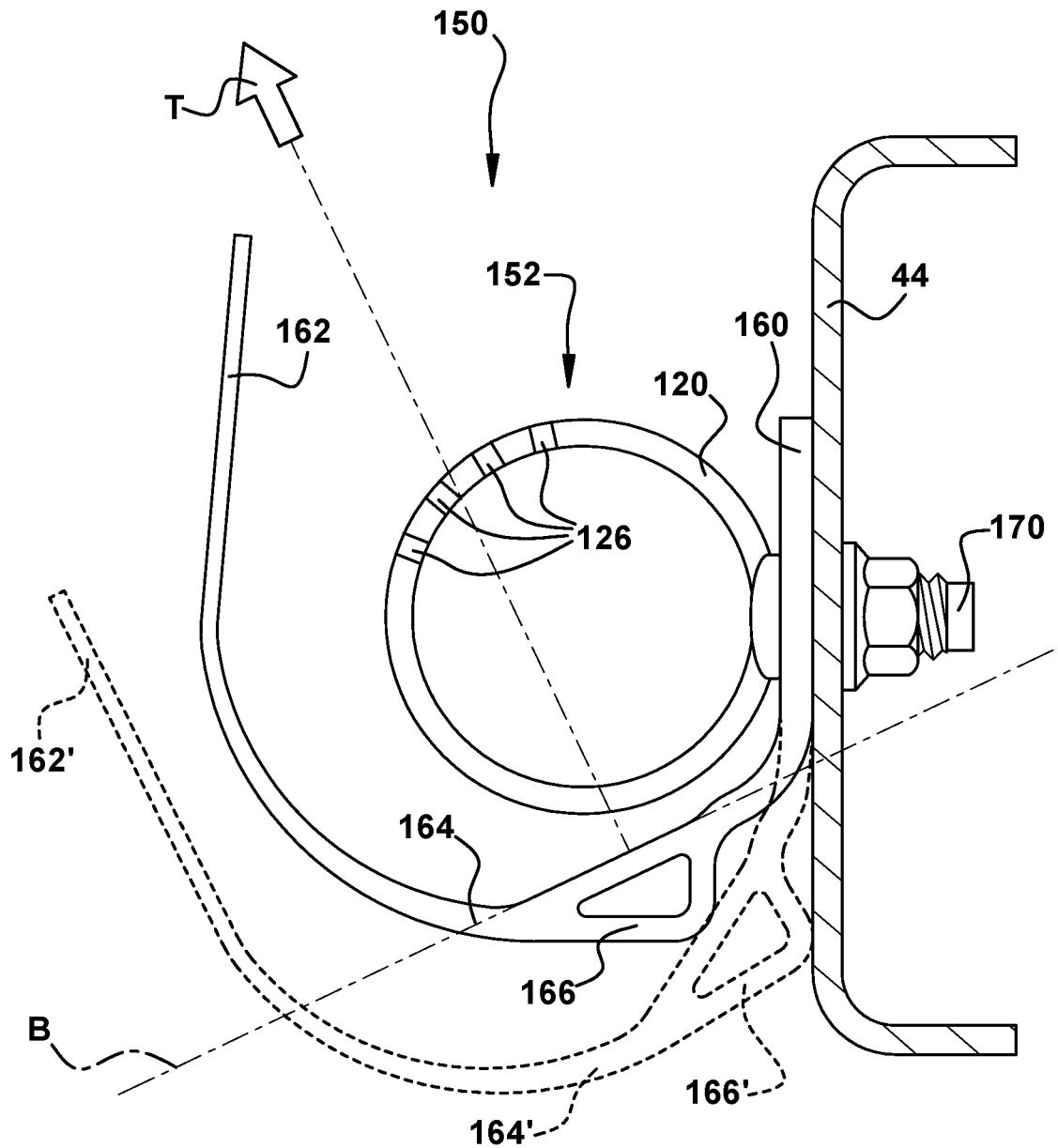

Referring to FIG. 11, the degree to which the various components or portions of the deployment ramp 150 are deflectable in response to airbag deployment can be tailored to provide a reaction surface that will produce a desired airbag deployment trajectory, indicated generally by the arrow labeled T in FIG. 11. For example, the thickness of the deployment ramp 150 in the areas of the mounting wall 160, bottom wall 164 and deployment wall 162 can be selected to provide a desired degree of rigidity/flexibility commensurate with the desired deployment trajectory T. The standoff 166 can be configured to help further control the deflection/bending in the areas of the mounting wall 160 and bottom wall 164. Additionally, the standoff can be configured so that it engages the vehicle structure (e.g., seat frame 44) and limits further movement of the bottom wall 164 and at least a portion of the deployment wall 162.

The reaction surface provided by the deployment ramp 150 can be configured, along with other components of the airbag module 100, so that its support of the deploying side airbag 110 can be rigid in directions opposite the desired deployment trajectory/direction T. The standoff 166 is particularly suitable for this purpose, as it can precisely control the orientation of the bottom wall 164. The bottom wall 164 can therefore be configured to provide a rigid reaction surface against which the side airbag 110 can deploy. In FIG. 11, it can be seen that the standoff 166, engaging the seat frame 44, provides rigid support for the bottom wall 164, especially in directions opposite the deployment direction T. This is because the deployment ramp 150 is configured so the bottom wall, in the condition of FIG. 11, extends along a base plane B that is normal to the deployment trajectory T.

Additionally, the inflator 120 can be configured so that inflation fluid is directed into the side airbag 110 in a direction that coincides with the desired deployment trajectory/direction T. For example, as shown in FIG. 11, the inflator 120 can be configured so that discharge openings 126 through which inflation fluid is directed into the side airbag 110 are configured to face in the direction of the desired deployment trajectory T. As a result, inflation fluid urges the inflating side airbag 110 in the desired deployment direction T, with the deployment ramp 150, particularly the bottom wall 164, forming a reaction surface against which the deploying airbag can act.

Furthermore, the deployment wall 162 can aid in deployment by serving as a buffer surface between the deploying side airbag 110 and the foam padding 52 and outer covering 50 of the seat 40. Doing so helps avoid direct engagement between the airbag 110 and the cover 50 and/or padding 52 that could block or otherwise inhibit airbag deployment. Additionally, the deployment wall 162, alone or aided by the padding/cover that it engages, can possess a sufficient degree of rigidity to help control the deployment trajectory of the side airbag 110 in the desired deployment direction T.

The vehicle 12 includes a sensor mechanism (not shown) for sensing the occurrence of an event for which inflation of the side airbag 110 is desired, such as a side impact to the vehicle 12 and/or a vehicle rollover. Upon sensing the occurrence of such an event, the sensor mechanism provides an electrical signal to the inflator 120. The electrical signal causes the inflator 120 to be actuated in a known manner. The inflator 120, when actuated, discharges fluid under pressure into the side airbag 110.

The side airbag 110 inflates under the pressure of the inflation fluid from the inflator 120. This causes the soft cover 130 to open, e.g., along a tear seam, as the side airbag 110 inflates and deploys. As the side airbag 110 continues to deploy, it engages the seat cover 50, causing it to open along one or more tear seams. The side airbag 110 deploys through the resulting opening in the seat cover 50 to the desired position between the occupant 14 and the side structure 20. This is shown in FIGS. 3, 5, and 6.

The side airbag 110, when inflated, extends along the side structure 20 of the vehicle 12 and is positioned between the side structure and any occupant 14 of the vehicle. The side airbag 110 covers portions of the vehicle side structure 20 including the B pillar 22 and/or the side door 24, depending on the seat position at the time of deployment. As shown in FIGS. 3 and 4, the side airbag 110 deploys along and covers the side door 24, primarily, along with a portion of the B pillar 22. As shown in FIG. 6, the side airbag 110 deploys along and covers the B pillar 22, primarily, along with a portion of the side door 24. Regardless, however, of the seat position, it can be seen that, through the configuration of the deployment ramp 150 specifically, and the airbag module 100 (e.g., inflator 120) generally, the airbag 110 can be deployed along the desired deployment trajectory T. Advantageously, the deployment trajectory T is configured so that the airbag 110 reaches the inflated and deployed condition efficiently and quickly, and in a repeatable and reliable manner.

The side airbag 110, when inflated, helps to protect the vehicle occupant 14 in the event of a vehicle rollover or a side impact to the vehicle 12. The side airbag 110, when inflated, also helps to absorb the energy of impacts with the airbag and helps to distribute the impact energy over a large area of the airbag.

Those skilled in the art will appreciate that the extent and coverage of the side airbag 110 in the vehicle 12 may vary. For example, the extent and coverage of the side airbag 110 may vary depending on a variety of factors, such as the architecture of the vehicle 12, the position of the side airbag in the vehicle, and the desired extent or coverage of the side airbag.

Figure 13:
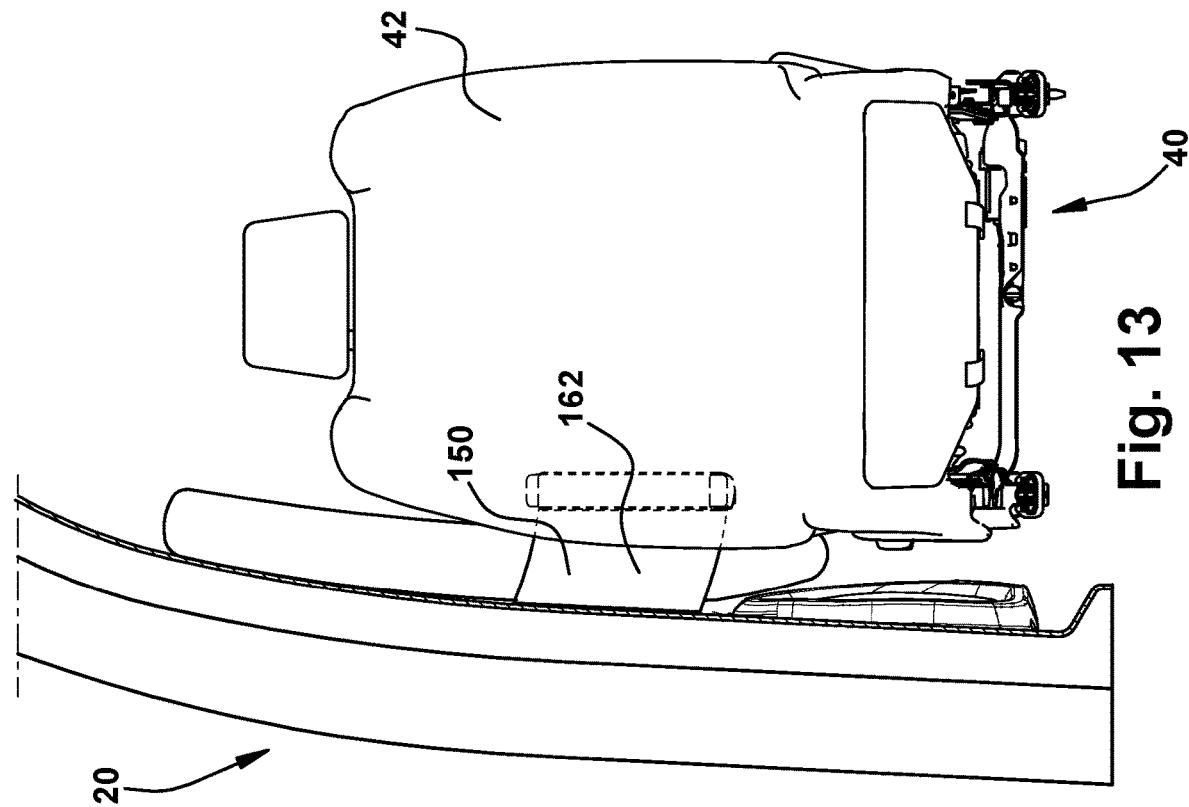
FIG. 13 is a rear view of the vehicle seat, adjacent outboard vehicle structure, and the airbag module shown in FIG. 12.
Figure 12:
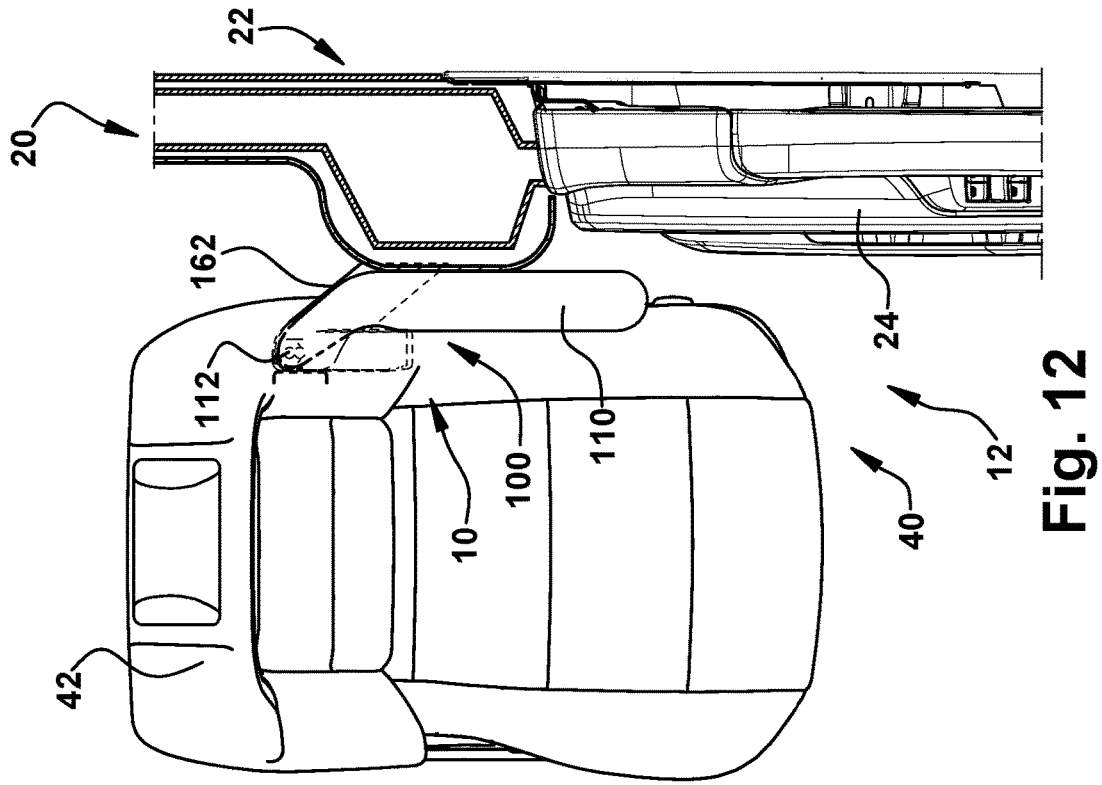
FIG. 12 is a top view illustrating the vehicle seat and adjacent outboard vehicle structure, in which the airbag module includes a deployment ramp according to another example configuration.

FIGS. 12-13 illustrate another example configuration of the apparatus 10. In this example configuration, the airbag module 100 can be similar or identical to the airbag module illustrated in FIGS. 1-11. The main difference is that the deployment ramp 150 of FIGS. 12-13 includes a deployment flap 162 that is configured to extend or span across the space between the vehicle seat 40 and the side structure 20. As shown in FIGS. 12 and 13, the deployment flap 162 extends from the seatback 42 to the B pillar 22. In this manner, the deployment ramp 150 can control the deployment trajectory of the deploying side airbag 110 in a manner that is similar or identical to that described above in regard to the example configuration of FIGS. 1-11.

The deployment flap 162 of the ramp 150 of FIGS. 12-13 provides the additional function of engaging and covering portions of the side structure 20, i.e., the B pillar 22 and/or side door 24, depending on factors such as the position of the vehicle seat 24 and the configuration of the particular vehicle 12 in which the apparatus 100 is installed. This configuration can be especially useful in vehicles where trim pieces or other portions of the side structure 20 present the possibility of snagging or otherwise impeding deployment of the side airbag 110. In these scenarios, the deployment flap 162 can extend across and/or cover the structures, seams, etc. that present these possibilities. Therefore, not only does the deployment ramp 150 serve as a reaction surface and help control the deployment trajectory of the side airbag 110, it can also provide a surface along which the airbag can deploy, covering structures that can inhibit deployment.

From the above description of the invention, those skilled in the art will perceive improvements, changes and modifications. Such improvements, changes and modifications within the skill of the art are intended to be covered by the appended claims.

Having described the invention, the following is claimed:

1. A deployment ramp for helping to direct a side airbag to deploy along a desired deployment trajectory from a vehicle seatback to a deployed position, the deployment ramp comprising:
   a mounting wall configured to be connected to a seat frame of the seatback;
   a deployment wall configured to deflect outboard of the vehicle seatback in response to airbag deployment and at least partially cover padding and/or a cover of the seatback; and
   a bottom wall that extends between the mounting wall and the deployment wall, the bottom wall forming a reaction surface configured to support the side airbag against deployment in a direction opposite the deployment direction so that the side airbag deploys along the desired deployment trajectory.

2. The deployment ramp recited in claim 1, wherein the bottom wall is configured to deflect relative to the mounting wall to orient the bottom wall substantially normal to deployment trajectory.

3. The deployment ramp recited in claim 2, wherein the standoff is configured to limit deflection of the bottom wall relative to the mounting wall, blocking further deflection of the bottom wall at a point configured to orient the bottom wall substantially normal to the deployment trajectory.

4. The deployment ramp recited in claim 2, wherein the standoff is configured to control deflection of the bottom wall relative to the mounting wall, blocking further deflection of the bottom wall at a point configured to orient the bottom wall along a base plane that is substantially normal to the deployment trajectory.

5. The deployment ramp recited in claim 1, wherein the bottom wall is configured to deflect relative to the mounting wall to orient the bottom wall along a base plane that is substantially normal to the deployment trajectory.

6. The deployment ramp recited in claim 1, wherein the bottom wall includes a portion forming a standoff that projects from an outer surface of the bottom wall, opposite an inner surface of the bottom wall that is configured to face toward the airbag, wherein the standoff is configured to control deflection of the bottom wall relative to the mounting wall in response to airbag deployment.

7. The deployment ramp recited in claim 1, wherein the standoff is configured to engage vehicle structure and block deflection of the bottom wall relative to the mounting wall.

8. The deployment ramp recited in claim 7, wherein the standoff is configured to engage vehicle structure at a point during deflection of the bottom wall relative to the mounting wall where the bottom wall is oriented along a base plane that is substantially normal to the deployment trajectory.

9. The deployment ramp recited in claim 1, wherein the standoff comprises two or more legs that intersect the bottom wall and each other to form an opening extending the length of the deployment ramp.

10. The deployment ramp recited in claim 9, wherein the standoff is configured so that the opening has a generally triangular configuration.

11. The deployment ramp recited in claim 1, wherein the standoff has a tubular configuration and extends along the length of the deployment ramp.

12. The deployment ramp recited in claim 1, wherein the mounting wall comprises one or more openings for receiving a fastener for securing the deployment ramp to the vehicle seatback.

13. The deployment ramp recited in claim 1, wherein the deployment ramp has a uniform cross-section along its length so that it can be constructed as a plastic extrusion.

14. The deployment ramp recited in claim 1, wherein the deployment wall is configured to extend from the seatback into engagement with the side structure.

15. The deployment ramp recited in claim 14, wherein the deployment wall is configured to cover portions of the side structure.

16. The deployment ramp recited in claim 14, wherein the deployment trajectory has an outboard component and a forward component, with respect to the vehicle.

17. An airbag module comprising:
the deployment ramp of claim 1;
a side airbag; and
an inflator for inflating the side airbag, wherein the inflator comprises mounting studs that extend through the airbag and through openings in the mounting wall to connect the deployment ramp, side airbag, and inflator to the seatback.

18. The airbag module recited in claim 17, wherein the deployment ramp defines a channel for receiving the side airbag in a rolled and/or folded condition.

19. The airbag module recited in claim 18, further comprising an airbag wrap that encircles the deployment ramp with the side airbag rolled and/or folded in the channel to maintain the airbag module in a packaged condition, the airbag wrap being configured to rupture in response to inflation of the side airbag to allow the side airbag to inflate and deploy.

20. The airbag module recited in claim 19, wherein the airbag wrap has opposite ends with openings through which the inflator mounting studs extend to connect the airbag wrap to the airbag module.

21. The airbag module recited in claim 17, wherein the inflator comprises discharge openings through which inflation fluid is discharged into the airbag, wherein the discharge openings are configured to direct inflation fluid along the deployment trajectory.

22. A vehicle safety system comprising the airbag module of claim 17, a sensor for sensing vehicle conditions, and a controller that is operative to receive a signal from the sensor that is indicative of the sensed vehicle conditions, the controller being configured to evaluate the signal from the sensor to identify vehicle crash conditions and to control the actuation of the inflator to inflate and deploy the side airbag in response to the identified vehicle crash conditions.

23. The deployment ramp recited in claim 1, further comprising a standoff in the area of an interface between the mounting wall and the bottom wall, wherein the standoff is configured to reinforce the deployment ramp to control its resistance to deflection of the bottom wall relative to the mounting wall.

* * * * *